July 3, 1945.   B. STAHMER   2,379,837
CONTROL SYSTEM
Original Filed Aug. 20, 1941
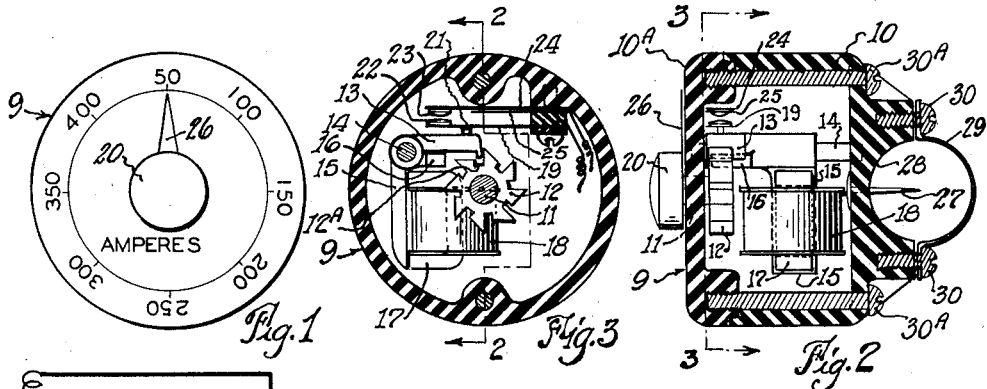
Fig.1  Fig.3  Fig.2
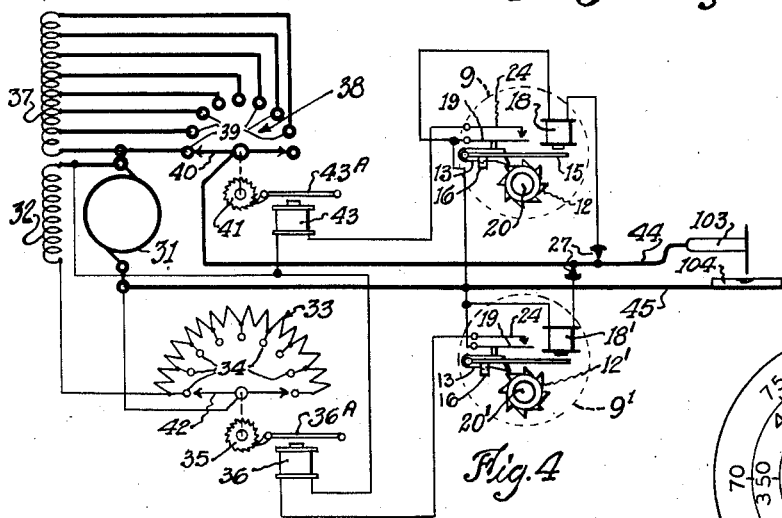
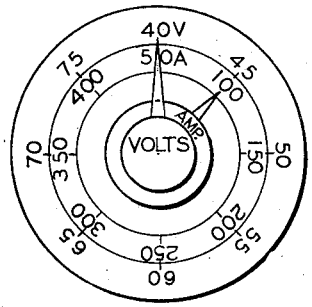
Fig.4  Fig.6
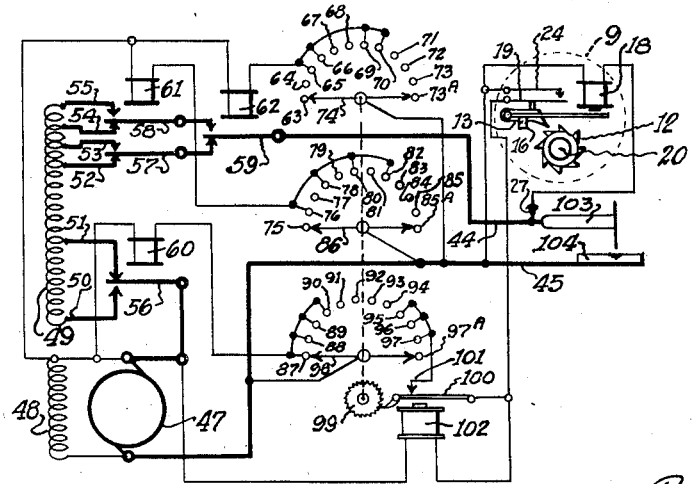
Fig.5
INVENTOR.
Bernhardt Stahmer
BY Frank Schraeder
Attorney Patented July 3, 1945

2,379,837

UNITED STATES PATENT OFFICE 2,379,837

CONTROL SYSTEM

Bernhardt Stahmer, Omaha, Nebr.

Substituted for abandoned application Serial No. 407,583, August 20, 1941. This application September 11, 1944, Serial No. 553,648

12 Claims. (Cl. 171—312)

My invention relates generally to control systems and more particularly to systems for remotely controlling and indicating the output capacity of an electric arc welding power generator, transformer, or rectifier and is a substitute for abandoned application Serial Number 407,583, filed Aug. 20, 1941.

An object of my invention, generally stated, is to provide a system for remotely controlling and indicating, at the location of the work, the power available for a welding operation, and the equipment for which system may be readily and economically manufactured and installed on or in connection with various welding apparatus.

An important object of my invention is to provide means for adjustably and selectively changing and controlling, from a remote position, the output capacity and characteristics of an electric arc welding generator, and to simultaneously indicate the condition of such adjustments at such remote position.

Another important object of my invention is to provide a control operatively associated with a single conductor connected to the welding apparatus and so arranged that when used in connection with one of the welding current supply cables, it will provide means for the remote control and indication of either the voltage or current, or both, for the welding operator conveniently arranged in operative association with the welding electrode.

Another object of my invention is to provide a comparatively small and compact control switch which can be readily operatively connected to or clamped on one of the load circuit conductors, preferably on the welding electrode conductor or electrode holder for remotely controlling and indicating the source of current power supply.

Since it is also apparent that this small control switch can be built integrally with the electrode holder, this also can be considered as one of my objects.

An important feature and object of my invention is to provide the armature of a small electromagnet with a coacting latch operatively associated with a ratchet wheel and the mounting of all of these elements within the casing of the remote control switch so that such remote control switch can only be turned when the current is on, and then only in one direction, to insure and maintain the proper synchronous registration of such remote control switch with the control means at the power source.

Since it would be a simple expedient to provide two ratchet wheels with an over-running clutch on a single control knob, each with its control means, to operate the rotary switch in opposite directions, such switch could easily be adapted as a remote control and indicator for the control system disclosed by Harold J. Graham in Patent No. 2,189,603 and therefore, another object of my invention is to provide a control and indicator therefor for the control of heavy current circuit breakers or relays, directly through a stepping switch, or indirectly through a stepping switch and circuit breakers, by means of the remote control and indicating switch at or near the electrode holder.

In the present known conventional systems, and in other more recent systems heretofore devised for welding apparatus, such as the system described in the Graham Patent No. 2,189,603, there are certain known operative disadvantages, for example, the adjustment or power setting at the source of welding power is not indicated to the operator at the place of welding or at the electrode holder; also, it is quite conceivable that when the welding current itself is used for control purposes, as in said Graham patent, instead of an independent wire such as I use, a contact may be made that duplicates in resistance the control value of resistance thus resulting in a faulty operation of the control system. One of the objects of my invention may therefore be considered as overcoming these disadvantages.

Other objects of my invention will in part be obvious and in part appear hereinafter.

My invention accordingly is disclosed in the preferred embodiments thereof shown in the accompanying drawing and comprises certain novel features of construction, combination of elements and arrangement of parts described in the following specifications and particularly defined in the appended claims.

For a more complete understanding of the nature and scope of my invention, reference may be had to the following detailed description taken in connection with the accompanying drawing, in which Fig. 1 is a front view of a remote control switch embodying certain novel features of my invention;

Fig. 2 is a vertical section of the remote control switch taken on line 2—2 of Fig. 3;

Fig. 3 is a sectional view of the remote control switch taken on line 3—3 of Fig. 2;

Fig. 4 illustrates diagrammatically a concrete embodiment of my invention;

Fig. 5 illustrates diagrammatically another or modified embodiment of my invention in which the control circuit is made up of components readily available on the market with the exception of the remote control switch employed on or near the welding electrode holder; and Fig. 6 is a front view of a combined double control switch similar in construction to the single control switch shown in Figs. 1, 2 and 3, but providing a combined ampere and volt control in one switch case.

Referring now specifically to Figs. 1, 2 and 3, the remote control switch is generally indicated by numeral 9. Ten indicates a suitable casing, of Bakelite or other insulating material, which encloses and supports on the cover 10^A a rotatable shaft 11 operatively connected to the control knob 20. Secured to the rotatable shaft 11, as by a knurled press fit, is a specially designed ratchet wheel 12, and cooperating with the ratchet wheel 12 is a specially designed locking pawl 13 pivoted about a pin 14. Also pivotally mounted on pivot pin 14 is an electromagnet armature 15 which is formed with an integral stop projection 16 which extends under and engages in contact with the underside of the pawl 13. Seventeen denotes a U-shaped iron core of the wound electromagnet coil 18.

The pawl 13 is forced into contact with the stop 16 by the pressure of the insulated stud 21 of Bakelite carried by the leaf spring 19. To the leaf spring 19 is welded, or riveted, a silver contact point 22. The silver contact point 22 cooperates with a similar contact point 23 which is secured to another leaf spring 24, steadied and adjusted by the stop spring 25. Numeral 26 indicates an indicator pointer which indicates the relative position of the stepping switch at the welder power source. Twenty-seven denotes a sharp pointed pin which is adapted to be forced through the welder cable insulation to thereby make a connection for one side of the winding of coil 18. Twenty-eight indicates a substantially semi-circular recess of the cable clamp portion of the Bakelite casing 10, which cooperates with a substantially semi-circular metal clamp 20 and screws 30 which extend through the flat ends of the clamp 29 into the casing, for securely holding the switch 9 on the load circuit conductor near the welding electrode holder.

It may be here noted that the pawl 13, armature 15, and its projection 16, are so adjusted that, when the coil 18 is energized, the pawl 13 rests in the position shown in Fig. 3, but when the magnet is deenergized, the pawl 13 is moved into one of the notches 12^A of the ratchet wheel 12 so that the ratchet 12 and shaft 11 and knob 20 cannot be turned in either direction. When the magnet is energized the pawl 13 is raised through the movement of armature 15 and its integral projection 16 to the position illustrated in Fig. 3 and the knob 20, ratchet 12 and shaft 11 can then be turned in one proper operative direction only due to the ratchet effect between pawl 13 and ratchet wheel 12. When the ratchet wheel 12 is rotated, the contacts 22 and 23 are closed and opened with a snap action due to the ratchet teeth construction so that no arcing results during such rotation of the ratchet. It is of course quite practical to substitute one of the several well-known micro-switch contacts for the contacts shown so that the contacts will be quickly successively snapped into closed and open positions.

I have preferred to illustrate in Fig. 4 a welding generator controlled by two separate remote control switches 9 and 9' each of the construction shown in Figs. 1, 2 and 3 for independently controlling the current and voltage. The switch 9 is the ampere-control switch and switch 9' is the volt-control switch.

In Fig. 4 is shown a schematic diagram of one complete control system embodying my invention in which 31 indicates a motor-driven generator and 32 indicates the generator shunt field. Thirty-three indicates generally a combined field rheostat and stepping switch.

The switch contacts are designated by 34 and the rotary contact arm 42 is operatively connected for rotation with the driving ratchet 35. The electromagnet is indicated by 36 and its combined pawl and armature 36^A drives the ratchet 35. The generator 31 has a series field winding 27 which is tapped and connected to a rotary stepping switch generally indicated by 38 which is similar to switch 33 but built on a much larger and sturdier scale, so that it can handle the required heavy currents. The contacts for switch 38 are designated by numeral 39 and the rotary contact arm is designated by 40. This rotary contact arm 40 is actuated by the ratchet 41 which is driven by the combined pawl and armature 43^A operated by the electromagnet 43.

The electromagnets 36 and 43 are independently controlled by their remote control switches 9' and 9 shown schematically in Fig. 4 and structurally in Figs. 1, 2 and 3. The locking magnets 18' and 18 are connected directly across the welding power leads 44 and 45. It is apparent that when the generator is not operating both switches 9' and 9 are automatically locked inoperative, however, when power is available for welding either one or both of the switches 9'—9 can be operated. When the knob of the switch 9, for example, is rotated, the ratchet 12 will oscillate the pawl 13 and through stud 21 and leaf spring 19 will rapidly close and open the circuit through points 22 and 23 sending impulses to electromagnet 43 which magnet 43 will operate its combined pawl and armature 43^A to cause a rotation of ratchet 41 and its coacting stepping switch contact arm 40. The pointer 26 on the switch 9 is moved one point on its dial and so on as it is turned around. The operation of stepping switch contact arm 42 is similar, that is, switch 9' controls stepping switch 33 by impulses and its indicating pointer 26' also indicates the position of stepping switch contact arm 42.

Referring now to Fig. 5 I have shown a schematic diagram of a complete modified control system embodying my invention. However, since the heavy currents are controlled by circuit breakers, a standard telephone stepping switch can be used in connection with the employed heavy current relays, thus making it possible to use in the control circuit shown in Fig. 5, standard components available on the market with the exception of the small control switch 9. The motor-driven direct current generator 47 is provided with a shunt field 48 and a series field 49 with taps on the series field which are designated 50, 51, 52, 53, 54 and 55 respectively. The armatures of the heavy current relays are designated 56, 57, 58, 59, and the electromagnets of the heavy current relays are designated 60, 61 and 62 and these three heavy current relays are controlled by means of a three bank switch, each bank consisting of a series of contacts. One bank including contacts 63 to 73 inclusive and the rotary contact arm 74, the second bank including the contacts 75 to 85 inclusive and the rotary contact arm 86, and the third bank including the contacts 87 to 97 inclusive and the rotary contact arm 98. All of the contacts and arms 63 to 98 inclusive are available in a single unit switch from any automatic telephone manufacturing company with an operating ratchet wheel 99 together with a combined pawl and armature 100, a homing contact 101, and an electromagnet 102. In the circuit shown in Fig. 5, the small control switch 9 located at or near the welding electrode holder 103 will remotely control and indicate the position of the rotary contact arms 74, 86 and 98 since same are mounted on a common shaft and simultaneously rotatable by ratchet wheel 99 which is operated by the electromagnet 102 and its combined pawl and armature 100. As shown in Fig. 5, the three banks make various combinations of contacts so that the three heavy relays 60, 61 and 62 make eight combinations of power control in increasing steps.

Where greater reliability of control is required a speed limiting clutch for the control switch 9 may be provided within the casing 10.

In the drawing, the load circuit conductors 44 and 45, and their connections, are illustrated by heavy lines and the control circuit conductors are illustrated by comparatively lighter lines.

The operation of my invention as herein illustrated may be described as follows:

The control dial shown in Figs. 1, 2 and 3 consists of a knob with a pointer and designations of position as shown in Fig. 1. This knob and pointer are operatively connected to the mechanism shown in Figs. 2 and 3 in such a manner that a circuit is closed whenever the pointer is moved from one dial designation to the next by means of contact springs 19 and 24 actuated by pawl 13 and ratchet wheel 12.

The pawl 13 and ratchet wheel 12 insure that the pointer can be turned only in a clockwise direction.

An electromagnet 18, when energized, prevents the pawl 13 from engaging one of the notches 12A. When not energized the pawl 13 engages within one of the notches 12A and locks the ratchet wheel 12 so that no rotation of the pointer 26 can be made.

A combined current and voltage remote control dial operator is illustrated in Fig. 6 and such operator combined both of the operators 9 and 9' shown in Fig. 4. The two dials and control mechanisms are concentrically mounted in a single casing.

The voltage adjustment ratchet wheel 12' being operable by a central shaft fixed to the central knob marked Volts in Fig. 6, and the current adjustment ratchet wheel 12 being operable by a sleeve shaft fixed to a circular knob marked Amp. The shaft for the ratchet wheel 12' being arranged to extend through the sleeve shaft which operates the ratchet wheel 12. As above indicated, the separate control adjustment operators 9 and 9' shown in Fig. 4 may be mounted in adjacent positions in a single case and operatively connected at one circuit end with either one of the load circuit conductors 44 or 45 and at the other end of the circuit with the energizing circuits which include the electromagnets 36 and 43.

Fig. 4 illustrates one circuit using the basic principles of my invention for controlling a welding operation.

Two dial operators shown in Figs. 1, 2 and 3 are shown schematically in Fig. 4 and designated respectively 9 and 9'.

The locking coils 18 and 18' are connected directly across the welder load circuit conductors 44 and 45 so that the operators 9 and 9' are inoperative when power is not available at the electrode holder 103.

When power is available the knob 20 is rotated in a clockwise direction until it indicates the right value of current for the work to be done and welding rod selected. When the knob 20 is turned the contacts 22 and 23 are closed and opened as the indicator 26 passes over each dial designation. When the contacts 22 and 23 are closed, current flows from the welding generator through coil 43, contacts 22 and 23 and back to the welding generator so that the magnet 43 is energized this causes the combined armature and pawl 43A to be moved to rotate the ratchet wheel 41 one step and likewise the rotary switch contact arm 40, one step onto one of the contacts 39. During such rotation of knob 20, the contact arm 40 passes over the contacts 39 in a clockwise direction in synchronism with the dial pointer 26. The contact points 39 are connected to the series field in such a manner that the current in the welding arc, as designated on the dial of the switch 9, will be maintained.

Voltage control is secured through switch 9' which controls the shunt field 32. For this purpose the dial for switch 9' is calibrated in volts. The operation of the switch 9' and its stepping switch 33 is identical to that for dial 9. However, in this case the contact points 34 are connected to a resistance which in effect forms a field rheostat for the shunt field 32. Since the current in this case is comparatively very small, the stepping switch 42 can be of much lighter construction.

The operation of the system shown in Fig. 5 may be described as follows:

The circuit shown employs only one remote control switch 9 and shows a system wherein the current control can be effected by the use of standard control elements now available on the market, with the exception of the remote control switch 9.

The control dial 9 is constructed as shown in Figs. 1, 2 and 3, but a standard rotary stepping switch, such as used in automatic telephony, is employed for control. It consists of a driving magnet 102 which drives a ratchet wheel 99 mounted on a shaft to which all three of the rotary contact arms 98, 86 and 74 are secured for simultaneous movement. These contact arms control heavy current relays 60, 61 and 62, so as to provide progressively increasing current in the load circuit conductors 44 and 45.

When dial pointer 26 of the switch, illustrated in Fig. 1, is on the indication designated 50 amperes, the rotary contact arms 98, 86 and 74 are in the positions shown in Fig. 5, and when the generator 47 is operating, current will flow through arm 98 and will energize coil 60 and not coils 61 or 62 so that the seven turns of the schematic series coil 49 between tops 51 and 52 are in use.

The following table will show, for purposes of illustration, the progressively increased amperage supplied to the load circuit in the simultaneous step movements of the arms 98, 86 and 74 during the successive rotations of the ratchet wheel 99 which is moved by the armature 100 at each energization of the electromagnet 102, which is successively energized by the successive closing and opening of the contact points 22 and 23 through the rotation of the remote control operator ratchet wheel 12, rotatable by the knob 20.

*Table illustrating relative positions in point to point movement of rotary switch arms 98, 86 and 74, coils energized, number of turns of series field winding in use, as illustrated, between indicated tap connections*

| Movement on dial | Arm 98 at contact | Arm 86 at contact | Arm 74 at contact | Coils energized | Turns of coil | Taps | Ampere indicating on dial |
|---|---|---|---|---|---|---|---|
| Start as in Fig. 5 | 87 | 75 | 63 | 60 | 7 | 51 to 52 | 50 |
| 1st point | 88 | 76 | 64 | 60 and 61 | 9 | 51 to 53 | 100 |
| 2nd point | 89 | 77 | 65 | 60 and 62 | 11 | 51 to 54 | 150 |
| 3rd point | 90 | 78 | 66 | 60, 61, 62 | 13 | 51 to 55 | 200 |
| 4th point | 91 | 79 | 67 | None | 15 | 50 to 52 | 250 |
| 5th point | 92 | 80 | 68 | 61 | 17 | 50 to 53 | 300 |
| 6th point | 93 | 81 | 69 | 62 | 19 | 50 to 54 | 350 |
| 7th point | 94 | 82 | 70 | 61 and 62 | 21 | 50 to 55 | 400 |
| 8th point | 95 | 83 | 71 | (See below) | | | 50 |

When the stepping switch is moved up to the eighth contact so that arm 98 comes into contact with the switch contact 95, a circuit is made from the generator 47 through the arm 98, contact 95 to the interrupter 101 and coil 102 so that the armature 100 vibrates and rapidly steps all of the arms around until the vibrator contact circuit 101 remains open. This operation returns the arms 98, 86 and 74 to the original starting position, as shown in Fig. 5. Therefore, although only eight steps of the stepping switch are in use, a standard eleven point switch can be used and, to all effects and purposes, it operates as if it were an eight point switch.

When in this last named or starting position, seven turns of the generator series coil 49 between taps 51 and 52 are again in use, and the remote control switch dial again indicates 50 amperes.

It is to be understood, of course, that the number of turns in illustrative schematic series coil 49 is for illustrative purposes only, and does not have any connection with the actual generator design other than to show progressive control.

I claim:

1. The combination with an electric welding generator of a remote control system for remotely adjustably and selectively controlling the output capacity of the electric generator, said system including a load circuit, means for varying the current values in the load circuit, means for varying the voltage of the load circuit, electro-responsive means for actuating said current value varying means, electro-responsive means for actuating said voltage varying means, energizing circuits for said electro-responsive means electrically operatively associated with the load circuit, and remote control means for adjustably and selectively varying the current and voltage of the load circuit, said remote control means including manually operable adjustable means electrically connected to said energizing circuits and to said load circuit for completing said energizing circuits to cause operation of said electro-responsive means for selectively independently and adjustably actuating said current and voltage varying means.

2. The combination with an electric welding generator of a remote control system for remotely adjustably and selectively controlling the output capacity of the electric generator, said system including a load circuit, means for varying the voltage of the load circuit, separate electro-responsive means for actuating said current value varying means, separate electro-responsive means for actuating said voltage varying means, a separate energizing circuit for each of said electro-responsive means electrically operatively associated with the load circuit, and remote control means for adjustably and selectively varying the current and voltage of the load circuit, said remote control means including separate manually operable adjustable means electrically connected across said energizing circuits and said load circuit for completing said energizing circuits to cause operation of said electro-responsive means for selectively independently and adjustably actuating said current and voltage varying means.

3. The combination with an electric welding generator of a remote control system including a load circuit, means for varying the current values in said load circuit, electro-responsive means for actuating said current value varying means, an energizing circuit for said electro-responsive means electrically operatively associated with the load circuit; and remote control means for adjustably varying the current values in the load circuit including manually operable circuit closing and opening means electrically connected across said energizing circuit and said load circuit for completing said energizing circuit to cause operation of said electro-responsive means to thereby actuate said current value varying means.

4. In a remote control system as embodied in claim 1 and wherein said current value varying means includes a rotary stepping switch for the series field winding of the generator and wherein said voltage varying means includes a combined rheostat and rotary stepping switch for the shunt field winding of the generator, and wherein said stepping switches are independently progressively operable by said electro-responsive means; said remote control manually operable circuit-completing means being operable in synchronism with each of said rotary switches.

5. In a remote control system as embodied in claim 1 and wherein said current value varying means includes a rotary stepping switch for the series field winding of the generator and wherein said voltage varying means includes a combined rheostat and rotary stepping switch for the shunt field winding of the generator, wherein said stepping switches are independently progressively operable by said electro-responsive means, and wherein each of said electro-responsive means comprises an electro-magnetically actuated pawl and ratchet wheel actuator for each of said rotary switches connected within each of said energizing circuits; said remote control circuit-completing means comprising a normally open operating switch within each of said energizing circuits, a pawl and manually rotatable ratchet wheel for each of said operating switches adapted for independently intermittently instantaneously actuating said operating switches whereby said electro-magnetically actuated actuators cause progressive rotations of said rotary switches responsively to intermittent electrical impulses and in synchronism with said manually rotatable ratchet wheels.

6. In a remote control system as embodied in claim 1 and wherein said current value varying means includes a rotary stepping switch for the series field winding of the generator and wherein said voltage varying means includes a combined rheostat and rotary stepping switch for the shunt field winding of the generator, wherein said stepping switches are independently progressively operable by said electro-responsive means, and wherein each of said electro-responsive means comprises an electro-magnetically actuated pawl and ratchet wheel actuator for each of said rotary switches connected within each of said energizing circuits; said remote control circuit-completing means comprising a normally open operating switch within each of said energizing circuits, a pawl and manually rotatable ratchet wheel for each of said operating switches adapted for independently intermittently instantaneously actuating said operating switches whereby said electro-magnetically actuated actuators cause progressive rotations of said rotary switches responsively to intermittent electrical impulses and in synchronism with said manually rotatable ratchet wheels, and said remote control means including dial indicating means for indicating the corresponding positions of said current and voltage switches at the generator.

7. In a remote control system as embodied in claim 3 and wherein said current value varying means includes a rotary stepping switch for the series field winding of the generator, said stepping switch being progressively operable by said electro-responsive means, and wherein said electro-responsive means comprises an electro-magnetically actuated pawl and ratchet wheel actuator in said energizing circuit for progressively rotating said rotary stepping switch; said remote control circuit-completing means comprising a normally open operating switch in said energizing circuit, manually rotatable means adapted for intermittently instantaneously closing and opening said normally open operating switch to thereby transmit one or more electrical impulses to the electromagnet of said electro-magnetically actuated actuator to cause progressive rotation of said rotary switch responsively to and in synchronism with said manually rotatable means, and said remote control means including dial indicating means for indicating the corresponding current value setting of the current control switch at the generator.

8. In a remote control system as embodied in claim 3 and wherein said current value varying means includes a rotary stepping switch for the series field winding of the generator, said stepping switch being progressively operable by said electro-responsive means, and wherein said electro-responsive means comprises an electro-magnetically actuated pawl and ratchet wheel actuator in said energizing circuit for progressively rotating said rotary stepping switch; said remote control circuit-completing means comprising a normally open operating switch in said energizing circuit, manually rotatable means adapted for intermittently instantaneously closing and opening said normally open operating switch to thereby transmit one or more electrical impulses to the electromagnet of said electro-magnetically actuated actuator to cause progressive rotation of said rotary switch responsively to and in synchronism with said manually rotatable means, and including locking means operatively associated with said remote control comprising electro-magnetically operable means permitting rotation of said manually rotatable means for intermittently closing and opening said operating switch responsively to the flow of current in the load circuit and adapted for automatically locking said manually rotatable means to prevent operation of said operating switch in the absence of flow of current in the load circuit.

9. In the remote control system defined in claim 2 wherein each of said separate energizing-circuit completing means comprises a normally open switch and a ratchet wheel for successively instantaneously closing and opening said normally open switch whereby successive electrical impulses are independently transmitted to each of said separate electro-responsive means for selectively independently and adjustably actuating said current and voltage varying means.

10. In the remote control system defined in claim 2 wherein each of said separate energizing-circuit completing means comprises a normally open switch and a ratchet wheel for successively instantaneously closing and opening said normally open switch whereby successive electrical impulses are independently transmitted to each of said separate electro-responsive means for selectively independently and adjustably actuating said current and voltage varying means, and electrically operable locking means for said ratchet wheels adapted to lock said ratchet wheels against rotation in either direction when no current is flowing through the load circuit.

11. The combination with an electric welding generator of a remote control device adapted to remotely actuate a current or voltage regulating stepping switch of the generator, said generator being provided with an electro magnetic actuator operatively responsive to successive electrical impulses for progressively rotating a contact arm on said stepping switch, and said control device being interposed between the load circuit and an energizing circuit for said electromagnetic actuator, said control device including a normally open switch within said energizing circuit, a rotatable ratchet wheel having circumferentially spaced notches and adapted for successively instantaneously closing and opening said normally open switch, an electromagnetically operable pawl adapted to engage within one of said ratchet wheel notches to lock said ratchet wheel against rotation when the load circuit is not energized, a casing for enclosing and supporting said normally open switch, said ratchet wheel, and said electromagnetically operable pawl, said casing having dial notations thereon for indicating the values of the generator current or voltage changes accomplished through the rotation of said ratchet wheel, a knob for rotating said ratchet wheel, and a pointer connected to said knob cooperating with said dial notations to indicate the changes effected in the generator current or voltage output.

12. In a remote control system for an electric generator provided with a current or voltage regulating stepping switch, and an electromagnetic actuator operatively responsive to successive electrical impulses for progressively rotating a contact arm on said stepping switch; a remote control device adapted to actuate said current or voltage regulating stepping switch interposed between the load circuit and an energizing circuit for said electromagnetic actuator, said remote control device including a normally open switch within said energizing circuit, a rotatable ratchet wheel having circumferentially spaced notches and adapted for successively instantaneously closing and opening said normally open switch, an electromagnetically operable pawl adapted to engage within one of said ratchet wheel notches to lock said ratchet wheel against rotation when the load circuit is not energized, a casing for enclosing and supporting said normally open switch, said ratchet wheel, and said electromagnetically operable pawl, said casing having dial notations thereon for indicating the values of the generator current or voltage changes accomplished through the rotation of said ratchet wheel, and means for rotating said ratchet wheel, supported on said casing, cooperating with said dial notations to indicate the changes effected in the generator current or voltage output.

BERNHARDT STAHMER.